US008400443B2

(12) United States Patent
Yoo et al.

(10) Patent No.: US 8,400,443 B2
(45) Date of Patent: Mar. 19, 2013

(54) PLASMA DISPLAY DEVICE

(75) Inventors: Hak Kyoo Yoo, Gumi-si (KR); Suk Ha Woo, Gumi-si (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 12/432,271

(22) Filed: Apr. 29, 2009

(65) Prior Publication Data

US 2009/0322729 A1 Dec. 31, 2009

(30) Foreign Application Priority Data

Jun. 27, 2008 (KR) ........................ 10-2008-0061810

(51) Int. Cl.
*G06F 3/038* (2006.01)

(52) U.S. Cl. .............. 345/213; 345/60; 345/63; 345/67; 345/99

(58) Field of Classification Search .................... 345/60, 345/63, 67, 99, 213; 315/169.4
See application file for complete search history.

(56) References Cited

U.S. PATENT DOCUMENTS

| | | | | |
|---|---|---|---|---|
| 6,340,867 | B1 * | 1/2002 | Kang | 315/169.4 |
| 7,852,291 | B2 * | 12/2010 | Lim | 345/60 |
| 8,031,136 | B2 * | 10/2011 | Cho et al. | 345/60 |
| 2006/0001610 | A1 * | 1/2006 | Kang et al. | 345/67 |
| 2006/0227076 | A1 * | 10/2006 | Kim | 345/63 |
| 2007/0018914 | A1 * | 1/2007 | Kim et al. | 345/67 |
| 2007/0285374 | A1 * | 12/2007 | Choi | 345/99 |
| 2008/0174521 | A1 * | 7/2008 | Ha et al. | 345/60 |

* cited by examiner

*Primary Examiner* — Thuy Pardo
(74) *Attorney, Agent, or Firm* — KED & Associates LLP

(57) ABSTRACT

A plasma display device is provided. The plasma display device can prevent the generation of complementary bright spots or the occurrence of voltage peaking by adjusting the time to apply a bias voltage during a reset period. Thus, it is possible to improve the discharge properties and picture quality of a PDP.

19 Claims, 13 Drawing Sheets

PLASMA DISPLAY DEVICE

This application claims priority from Korean Patent Application No. 10-2008-0061810 filed on Jun. 27, 2008 in the Korean Intellectual Property Office, the disclosure of which is incorporated herein by reference in its entirety.

BACKGROUND OF THE INVENTION

1. Field of the Invention

The present invention relates to a plasma display device, and more particularly, to an apparatus for driving a plasma display panel (PDP).

2. Description of the Related Art

In general, plasma display panels (PDPs) cause discharges in a plurality of electrodes installed in a discharge space by applying a voltage to the electrodes and thus display an image by exciting phosphors with the aid of plasma generated by the discharges.

PDPs are easy to be implemented as large-scale thin display devices. In addition, since PDPs have a simple structure, it is possible to facilitate the manufacture of PDPs. Moreover, PDPs can provide higher luminance and higher light-emitting efficiency than most other flat panel displays.

PDPs are generally driven in a time-division manner in which the operating time of PDPs are divided into a reset period for initializing all discharge cells, an address period for selecting a number of discharge cells to be discharged, and a sustain period for causing a sustain discharge in each of the selected discharge cells.

However, PDPs are highly likely to be oversaturated with electric charge and may thus suffer from afterimage-type bright spots due to the occurrence of a strong discharge during the set-down period of a reset signal. In addition, such strong discharge may cause the switching of scan electrodes and the switching of sustain electrodes to be performed at the same time, and thus, various problems such as voltage peaking or generation of complement-color bright spots may arise. As a result, the reliability of PDPs may generally decrease.

SUMMARY OF THE INVENTION

The present invention provides a plasma display device.

According to an aspect of the present invention, there is provided a plasma display device including a plasma display panel (PDP) including an upper substrate, a plurality of scan electrodes formed on the upper substrate and a plurality of sustain electrodes formed on the upper substrate; and a driving unit applying a number of driving signals to the scan electrodes and the sustain electrodes, wherein, during a reset period of at least one of a plurality of subfields of a frame, a reset signal is applied to the scan electrodes and a positive bias voltage is applied to the sustain electrodes as a bias voltage signal, the reset period includes a set-up period during which the level of the reset signal gradually increases to a first voltage, an intermediate period during which the level of the reset signal drops from the first voltage to a second voltage and is then maintained at the second voltage, and a first set-down period during which the level of the reset signal gradually decreases from the second voltage, and the bias voltage signal is applied to the sustain electrodes during the intermediate period.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
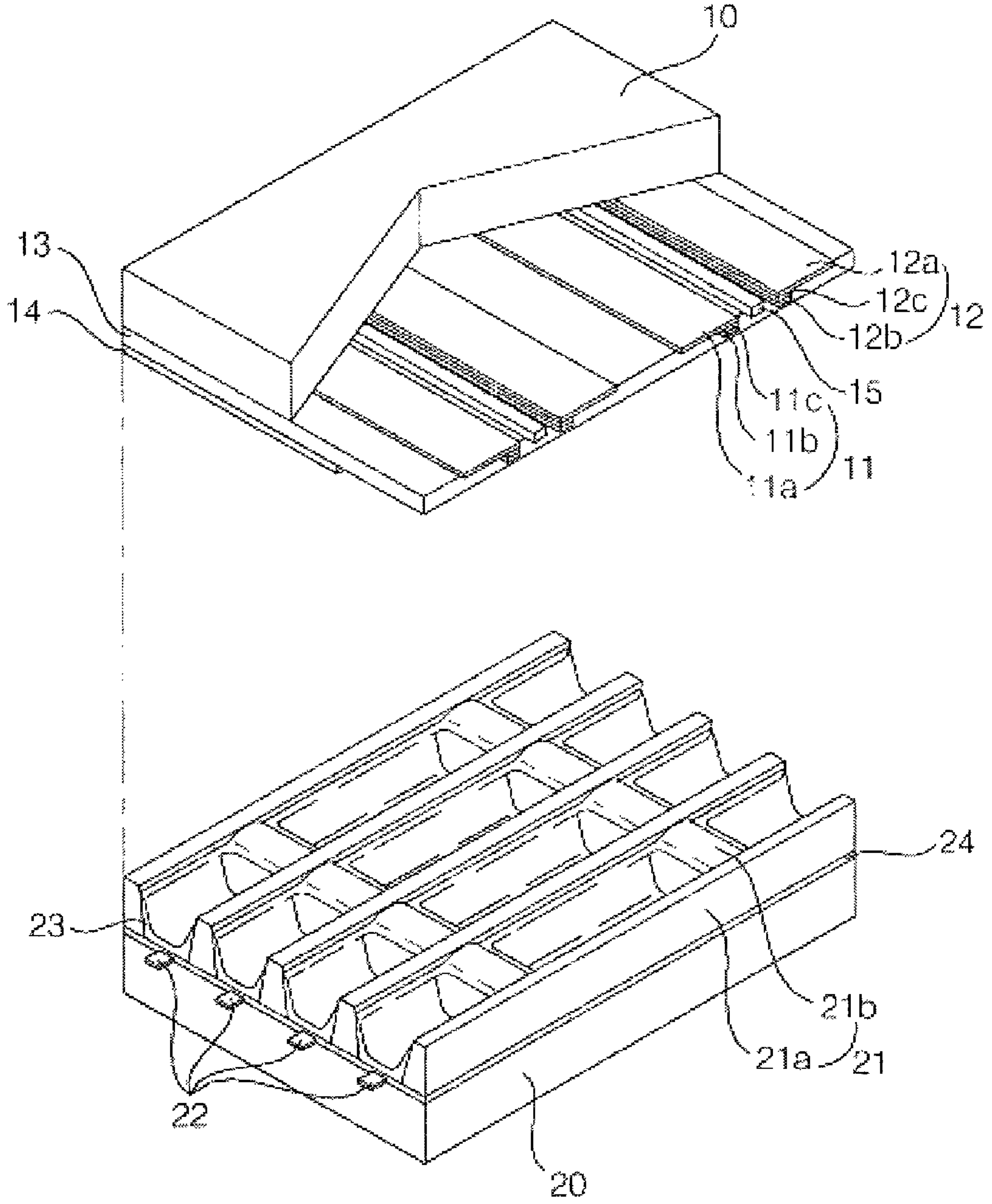
FIG. 1 illustrates a perspective view of a plasma display panel (PDP) according to an exemplary embodiment of the present invention.

FIG. 1 illustrates a perspective view of a plasma display panel according to an exemplary embodiment of the present invention. Referring to FIG. 1, the PDP includes an upper substrate 10, a plurality of electrode pairs which are formed on the upper substrate 10 and consist of a scan electrode 11 and a sustain electrode 12 each; a lower substrate 20; and a plurality of address electrodes 22 which are formed on the lower substrate 20.

Each of the electrode pairs includes transparent electrodes 11*a* and 12*a* and bus electrodes 11*b* and 12*b*. The transparent electrodes 11*a* and 12*a* may be formed of indium-tin-oxide (ITO). The bus electrodes 11*b* and 12*b* may be formed of a metal such as silver (Ag) or chromium (Cr) or may include a stack of chromium/copper/chromium (Cr/Cu/Cr) or a stack of chromium/aluminium/chromium (Cr/Al/Cr). The bus electrodes 11*b* and 12*b* are respectively formed on the transparent electrodes 11*a* and 12*a* and reduce a voltage drop caused by the transparent electrodes 11*a* and 12*a* which have a high resistance.

Each of the electrode pairs may include the bus electrodes 11*b* and 12*b* only. In this case, the manufacturing cost of the PDP can be reduced by not using the transparent electrodes 11*a* and 12*a*. The bus electrodes 11*b* and 12*b* may be formed of various materials other than those set forth herein, e.g., a photosensitive material.

Black matrices are formed on the upper substrate 10. The black matrices perform a light shied function by absorbing external light incident upon the upper substrate 10 so that light reflection can be reduced. In addition, the black matrices enhance the purity and contrast of the upper substrate 10.

More specifically, the black matrices include a first black matrix 15 which overlaps a plurality of barrier ribs 21, a second black matrix 11*c* which is formed between the transparent electrode 11*a* and the bus electrode 11*b* of each of the scan electrodes 11, and a second black matrix 12*c* which is formed between the transparent electrode 12*a* and the bus electrode 12*b*. The first black matrix 15 and the second black matrices 11*c* and 12*c*, which can also be referred to as black layers or black electrode layers, may be formed at the same time and may be physically connected. Alternatively, the first black matrix 15 and the second black matrices 11c and 12c may not be formed at the same time, and may not be physically connected.

If the first black matrix 15 and the second black matrices 11c and 12c are physically connected, the first black matrix 15 and the second black matrices 11c and 12c may be formed of the same material. On the other hand, if the first black matrix 15 and the second black matrices 11c and 12c are physically separated, the first black matrix 15 and the second black matrices 11c and 12c may be formed of different materials.

An upper dielectric layer 13 and a passivation layer 14 are deposited on the upper substrate 10 on which the scan electrodes 11 and the sustain electrodes 12 are formed in parallel with one other. Charged particles generated as a result of a discharge accumulate in the upper dielectric layer 13. The upper dielectric layer 13 may protect the electrode pairs. The passivation layer 14 protects the upper dielectric layer 13 from sputtering of the charged particles and enhances the discharge of secondary electrons.

The address electrodes 22 are formed and intersects the scan electrode 11 and the sustain electrodes 12. A lower dielectric layer 24 and the barrier ribs 21 are formed on the lower substrate 20 on which the address electrodes 22 are formed.

A phosphor layer is formed on the lower dielectric layer 24 and the barrier ribs 21. The barrier ribs 21 include a plurality of vertical barrier ribs 21a and a plurality of horizontal barrier ribs 21b that form a closed-type barrier rib structure. The barrier ribs 21 define a plurality of discharge cells and prevent ultraviolet (UV) rays and visible rays generated by a discharge from leaking into the discharge cells.

The present invention can be applied to various barrier rib structures, other than that set forth herein. For example, the present invention can be applied to a differential barrier rib structure in which the height of vertical barrier ribs 21a is different from the height of horizontal barrier ribs 21b, a channel-type barrier rib structure in which a channel that can be used as an exhaust passage is formed in at least one vertical or horizontal barrier rib 21a or 21b, and a hollow-type barrier rib structure in which a hollow is formed in at least one vertical or horizontal barrier rib 21a or 21b. In the differential barrier rib structure, the height of horizontal barrier ribs 21b may be greater than the height of vertical barrier ribs 21a. In the channel-type barrier rib structure or the hollow-type barrier rib structure, a channel or a hollow may be formed in at least one horizontal barrier rib 21b.

Red (R), green (G), and blue (B) discharge cells are arranged in a straight line. However, the present invention is not restricted to this. For example, R, G, and B discharge cells may be arranged as a triangle or a delta. Alternatively, R, G, and B discharge cells may be arranged as a polygon such as a rectangle, a pentagon, or a hexagon.

The phosphor layer is excited by UV rays that are generated upon a gas discharge. As a result, the phosphor layer generates one of R, G, and B rays. A discharge space is provided between the upper and lower substrates 10 and 20 and the barrier ribs 21. A mixture of inert gases, e.g., a mixture of helium (He) and xenon (Xe), a mixture of neon (Ne) and Xe, or a mixture of He, Ne, and Xe is injected into the discharge space.

Figure 2:
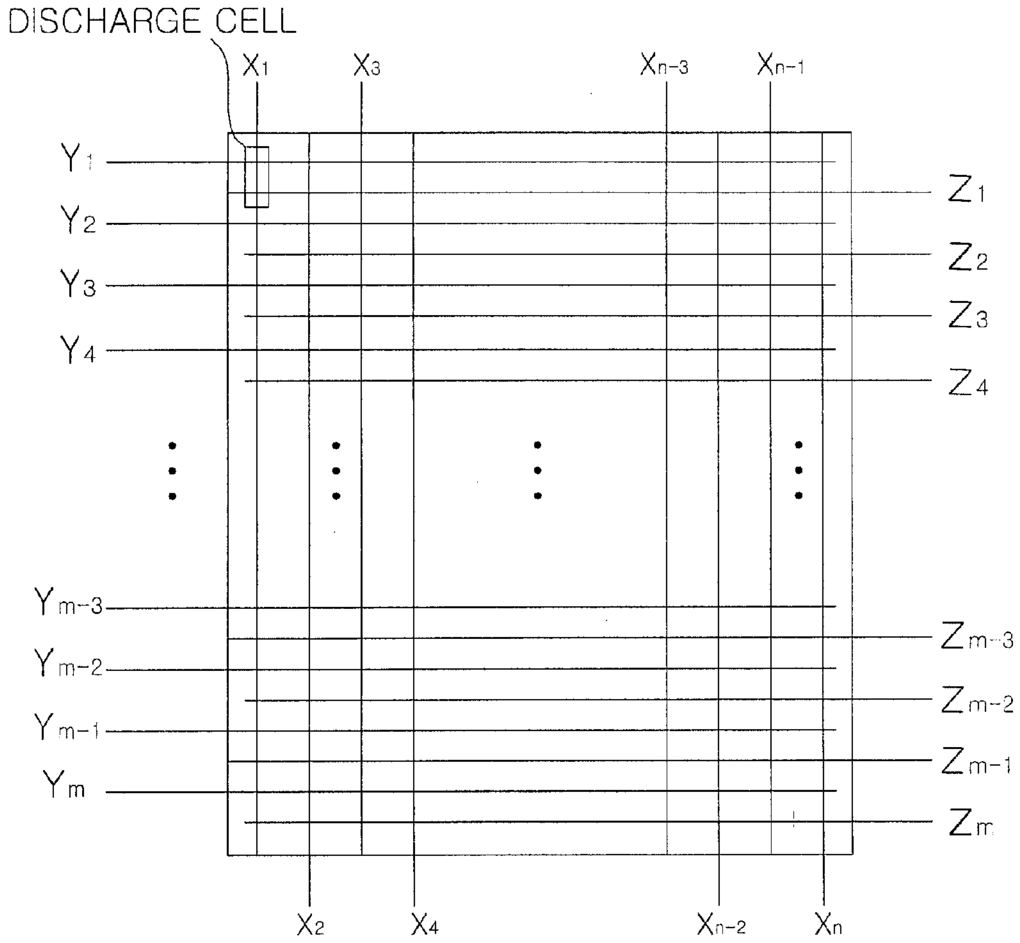
FIG. 2 illustrates a cross-sectional view for explaining the arrangement of electrodes in a PDP.

FIG. 2 illustrates the arrangement of electrodes in a PDP. Referring to FIG. 2, a plurality of discharge cells that constitute a PDP may be arranged in a matrix. The discharge cells are respectively disposed at the intersections between a plurality of scan electrode lines $Y_1$ through $Y_m$ and a plurality of address electrode lines $X_1$ through $X_n$ or the intersections between a plurality of sustain electrode lines $Z_1$ through $Z_m$ and the address electrode lines $X_1$ through $X_n$. The scan electrode lines $Y_1$ through $Y_m$ may be sequentially or simultaneously driven. The sustain electrode lines $Z_1$ through $Z_m$ may be simultaneously driven. The address electrode lines $X_1$ through $X_n$ may be divided into two groups: a group including odd-numbered address electrode lines and a group including even-numbered address electrode lines. The address electrode lines $X_1$ through $X_n$ may be driven in units of the groups or may be sequentially driven.

The electrode arrangement illustrated in FIG. 2, however, is exemplary, and thus, the present invention is not restricted to this. For example, the scan electrode lines $Y_1$ through $Y_m$ may be driven using a dual scan method in which two of a plurality of scan lines are driven at the same time. The address electrode lines $X_1$ through $X_n$ may be divided into two groups: a group including a number of upper address electrode lines disposed in the upper half of a PDP and a group including a number of lower address electrode lines disposed in the lower half of the PDP or a group including a number of address electrode lines disposed in the left half of the PDP and a group including a number of address electrode lines disposed in the right half of the PDP. Then, the address electrode lines $X_1$ through $X_n$ may be driven in units of the two groups.

Figure 3:
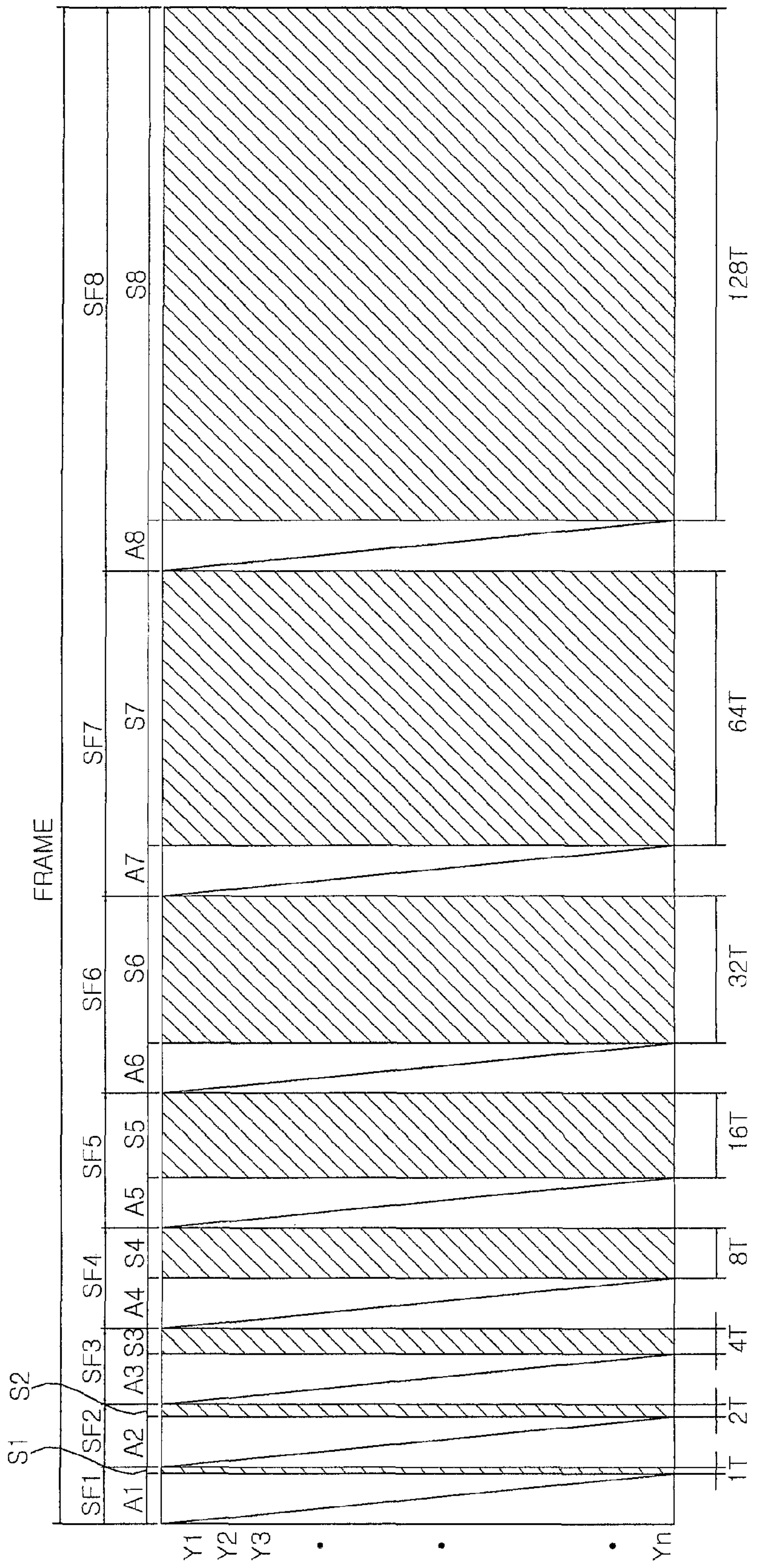
FIG. 3 illustrates a timing diagram for explaining a time-division method of driving a PDP in which a frame is divided into a plurality of subfields.

FIG. 3 illustrates a timing diagram for explaining a time-division method of driving a PDP in which a frame is divided into a plurality of subfields. Referring to FIG. 3, a unit frame is divided into a predefined number of subfields, for example, eight subfields SF1 through SF8, in order to realize a time-division grayscale display. Each of the subfields SF1 through SF8 is divided into a reset period (not shown), an address period (A1, . . . , A8), and a sustain period (S1, . . . , S8).

Not all of the subfields SF1 through SF8 may have a reset period. For example, only the first subfield SF1 may have a reset period, or only the first subfield and a middle subfield may have a reset period.

During each of the address periods A1 through A8, a display data signal is applied to an address electrode X, and a scan pulse is applied to a scan electrode Y so that wall charges can be generated in a discharge cell.

During each of the sustain periods S1 through S8, a sustain pulse is alternately applied to the scan electrode Y and a sustain electrode Z so that a discharge cell can cause a number of sustain discharges.

The luminance of a PDP is proportional to the total number of sustain discharge pulses allocated throughout the sustain discharge periods S1 through S8. Assuming that a frame for one image includes eight subfields and is represented with 256 grayscale levels, 1, 2, 4, 8, 16, 32, 64, and 128 sustain pulses may be respectively allocated to the sustain periods S1, S2, S3, S4, S5, S6, S7, and S8. In order to realize a grayscale level of 133, a plurality of discharge cells may be addressed during the first, third, and eighth subfields SF1, SF3, and SF8 so that they can cause a total of 133 sustain discharges.

The number of sustain discharges allocated to each of the subfields SF1 through SF8 may be determined according to a weight allocated to a corresponding subfield through automatic power control (APC). Referring to FIG. 3, a frame is divided into eight subfields, but the present invention is not restricted to this. In other words, the number of subfields in a frame may be varied. For example, a PDP may be driven by dividing each frame into more than eight subfields (e.g., twelve or sixteen subfields).

The number of sustain discharges allocated to each of the subfields SF1 through SF8 may be varied according to gamma and other characteristics of a PDP. For example, a grayscale level of 6, instead of a grayscale level of 8, may be allocated to the subfield SF4, and a grayscale level of 34, instead of a grayscale level of 32, may be allocated to the subfield SF6.

Figure 4:
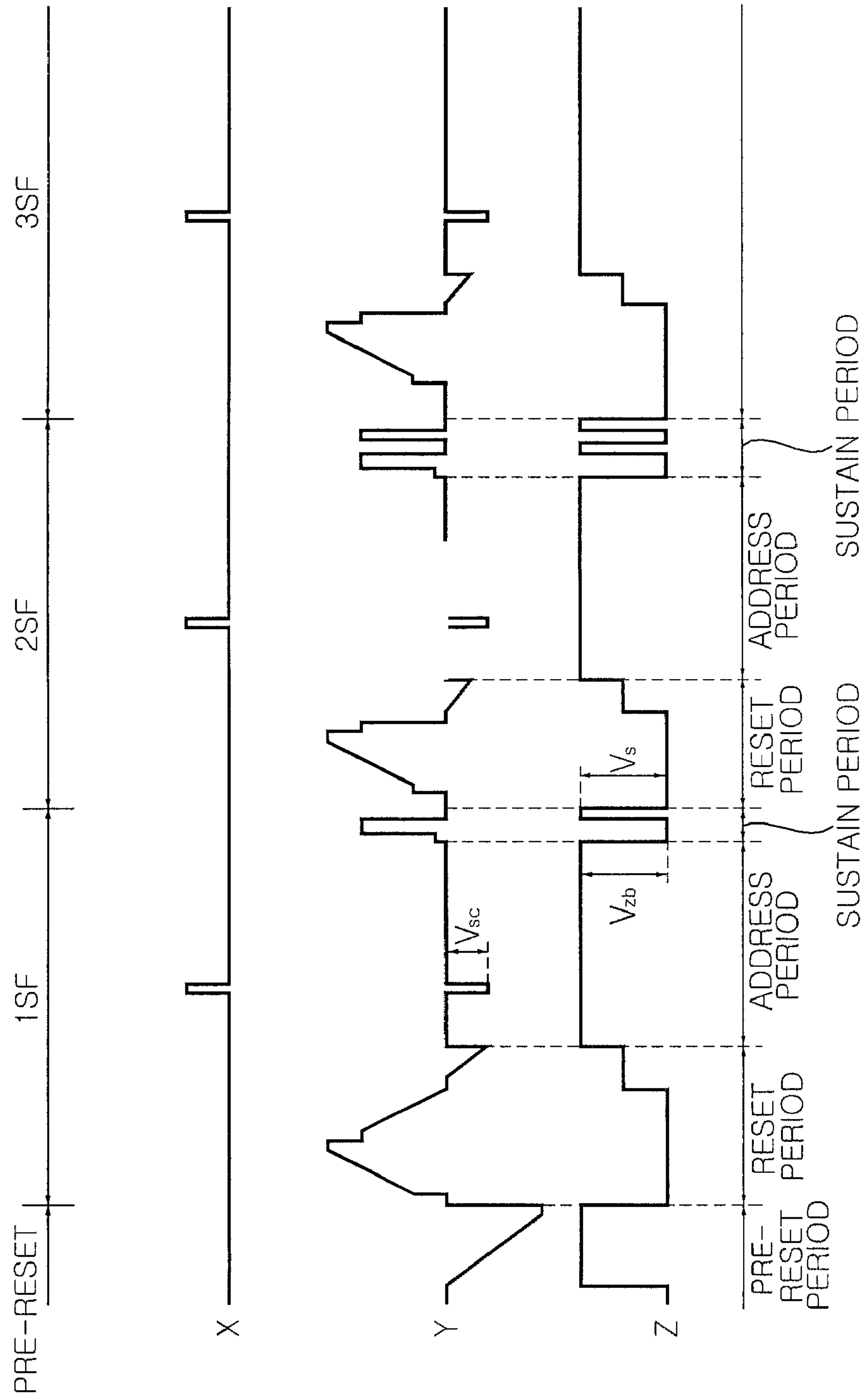
FIG. 4 illustrates a timing diagram of a plurality of driving signals for driving a PDP.

FIG. 4 illustrates a timing diagram of a plurality of driving signals for driving a PDP, according to an embodiment of the present invention. Referring to FIG. 4, a pre-reset period is followed by a first subfield. During the pre-reset period, positive wall charges are generated on scan electrodes Y and negative wall charges are generated on sustain electrodes Z. A subfield may include a reset period for initializing the discharge cells of a previous frame with reference to the distribution of wall charges generated during the pre-reset period, an address period for selecting a number of discharge cells, and a sustain period for enabling the selected discharge cells to cause a number of sustain discharges.

A reset period may include a set-up period during and a set-down period. During a set-up period, a ramp-up waveform is applied to all the scan electrodes Y at the same time so that all discharge cells each can cause a weak discharge, and that wall charges can be generated in the discharge cells, respectively.

During a set-down period, a ramp-down waveform whose voltage decreases from a positive voltage that is lower than a peak voltage of the ramp-up waveform is applied to all the scan electrodes Y so that each of the discharge cells can cause an erase discharge, and that whichever of the wall charges generated during the set-up period and space charges are unnecessary can be erased.

During an address period, a scan signal having a negative scan voltage Vsc may be sequentially applied to the scan electrodes Y while applying a positive data signal to the address electrodes X. Due to the difference between the scan signal and the data signal and the wall charges generated during the reset period, an address discharge occurs, and a cell is selected. In order to improve the efficiency of an address discharge, a bias voltage $V_{zb}$ may be applied to the sustain electrodes Z during an address period.

During an address period, the scan electrodes Y may be divided into two or more groups, and a scan signal may be sequentially applied to each of the groups. Each of the groups may be divided into two or more sub-groups, and a scan signal may be sequentially applied to each of the sub-groups. For example, the scan electrodes Y may be divided into a first group and a second group. Then, a scan signal may be sequentially applied to a number of scan electrodes Y included in the first group. Thereafter, a scan signal may be sequentially applied to a number of scan electrodes Y included in the second group.

More specifically, the scan electrodes Y may be divided into a first group including a plurality of even-numbered scan electrodes Y and a second group including a plurality of odd-numbered scan electrodes Y. Alternatively, the scan electrodes Y may be divided into a first group including a plurality of upper scan electrodes Y and a second group including a plurality of lower scan electrodes Y.

Once the scan electrodes Y are divided into first and second groups, each of the first and second groups may be divided into a first sub-group including a plurality of even-numbered scan electrodes Y and a second sub-group including a plurality of odd-numbered scan electrodes Y or a first sub-group including a plurality of upper scan electrodes Y and a second sub-group including a plurality of lower scan electrodes Y.

During a sustain period, a sustain pulse is alternately applied to the scan electrodes Y and the sustain electrodes Z so that surface discharges can occur between the scan electrodes Y and the respective sustain electrodes Z as sustain discharges.

Of a plurality of sustain pulses alternately applied to the scan electrodes Y and the sustain electrodes Z, the first or last sustain pulse may have a larger width than the other sustain pulses.

A subfield may also include an erase period following a sustain period. During an erase period, wall charges remained in the scan electrodes Y or the sustain electrodes Z of discharge cells (i.e., on-cells) selected during an address period may be removed by causing a weak discharge after a sustain discharge.

All or only some of first through eighth subfields may include an erase period. During an erase period, an erase signal for causing a weak discharge may be applied to electrodes to which the last one of a plurality of sustain pulses applied during a sustain period is not applied.

A ramp-type signal, a low-voltage wide pulse, a high-voltage narrow pulse, an exponential signal or a half-sinusoidal pulse may be used as an erase signal.

In order to cause a weak discharge, a plurality of pulses may be sequentially applied to the scan electrodes Y or the sustain electrodes Z.

The waveforms illustrated in FIG. 4 are exemplary, and thus, the present invention is not restricted thereto. For example, the pre-reset period may be optional. In addition, the polarities and voltages of driving signals used to drive a PDP are not restricted to those illustrated in FIG. 4, and may be altered in various manners. An erase signal for erasing wall charges may be applied to each of the sustain electrodes Z after a sustain discharge. The sustain signal may be applied to either the scan electrodes Y or the sustain electrodes Z, thereby realizing a single-sustain driving method.

The scan electrodes Y may be divided into two or more groups and may thus be driven in units of the groups.

Figure 5:
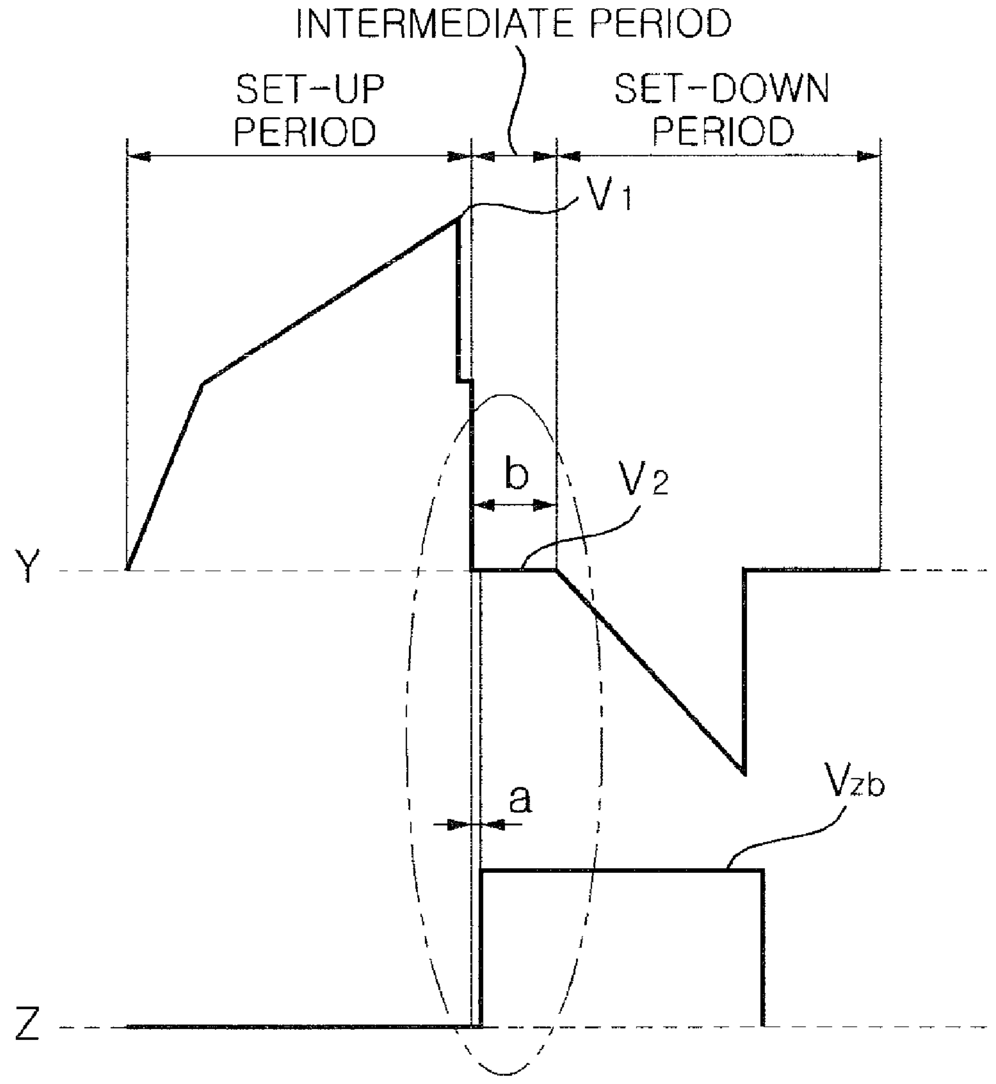
FIG. 5 illustrates a timing diagram of various signals for driving a PDP (particularly, a reset signal applied to scan electrodes) according to an exemplary embodiment of the present invention.

FIG. 5 illustrates a timing diagram of various signals for driving a PDP according to an exemplary embodiment of the present invention, and particularly, a reset signal and a bias voltage signal applied during a reset period. Referring to FIG. 5, during a reset period of at least one of a plurality of subfields of a frame, a reset signal may be applied to a plurality of scan electrodes Y, and a positive bias voltage may be applied to a plurality of sustain electrodes Z as a bias voltage signal. The reset signal may include a set-up period during which the level of the reset signal gradually increases to a first voltage, an intermediate period during which the level of the reset signal drops from the first voltage to a second voltage and is then maintained at the second voltage, and a set-down period during the level of the reset signal gradually decreases from the second voltage.

During the set-up period, negative wall charge for causing an address discharge may be generated in the scan electrodes Y, and spatial charge may be generated in discharge cells due to an increase in the level of the reset signal. If it fails to properly control the wall charge and the spatial charge, an address discharge operation may become unstable due to the interaction between the wall charge and the spatial charge, and thus, the probability of occurrence of miswriting may increase. These problems may become more apparent at high temperature or in a high-resolution PDP.

Referring to FIG. 5, when the level of the reset signal drops from the first voltage to the second voltage, a positive bias voltage may be applied to the sustain electrodes Z as a bias voltage signal. Alternatively, the application of the bias voltage signal to the sustain electrodes Z may be performed a predetermined amount of time after the beginning of the intermediate period. In this case, a length b of the intermediate period may be five or more times greater than a length a of the interval between the beginning of the intermediate period and the time when the application of the bias voltage signal to the sustain electrodes Z begins. Thus, even if the interval between the beginning of the intermediate period and the time when the application of the bias voltage signal to the sustain electrodes Z begins increases, the switching the scan electrodes Y and the switching of the sustain electrodes Z may be able to be performed substantially at the same time.

During the set-down period, a reset signal whose level gradually decreases may be applied to the scan electrodes Y, and a positive bias voltage may be applied to the sustain electrodes Z as a bias voltage signal. As a result, a weak discharge may occur between the scan electrodes Y and the sustain electrodes Z, and thus, unnecessary wall discharge may be removed. In short, the bias voltage signal may be applied to the sustain electrodes Z in order to cause a weak discharge and thus to remove unnecessary wall charge.

If the switching the scan electrodes Y and the switching of the sustain electrodes Z are performed substantially at the same time, voltage peaking may occur. In addition, if it fails to sufficiently remove unnecessary wall charge during the set-down period, afterimage-type bright spots may be generated by excessive wall charge.

A quick switching may rapidly increase the difference between the electric potential of the scan electrodes Y and the electric potential of the sustain electrodes Z, and may thus cause a strong discharge to occur between the scan electrodes Y and the sustain electrodes Z. Then, the probability of occurrence of miswriting or a misdischarge during an address period may increase. If it fails to sufficiently remove unnecessary wall charge, the distribution of charge throughout discharge cells may become irregular, and thus, complementary bright spots may be generated.

The color temperature of an image displayed by a PDP may need to appear as natural as possible to a viewer. Therefore, the amount of primary-color light emitted from each of R, G and B cells may be appropriately adjusted so as to achieve an optimum color temperature. However, when there are differences between the charge levels of discharge cells, the amount of light emitted may considerably vary from one discharge cell from another discharge cell, and thus, complementary afterimages may be generated.

Complementary afterimages may be generated when a color image is displayed for more than a predetermined amount of time and is then replaced with another color image, and particularly with a black-pattern image. Since light is represented by a mixture of the three primary colors, i.e., R, G and B, yellow light may appear on an image when R cells are turned off and G and B cells are turned on. In this case, if the whole image is replaced with a black-pattern image when the distribution of wall charge is irregular, red afterimage bright spots may be generated.

Figure 6:
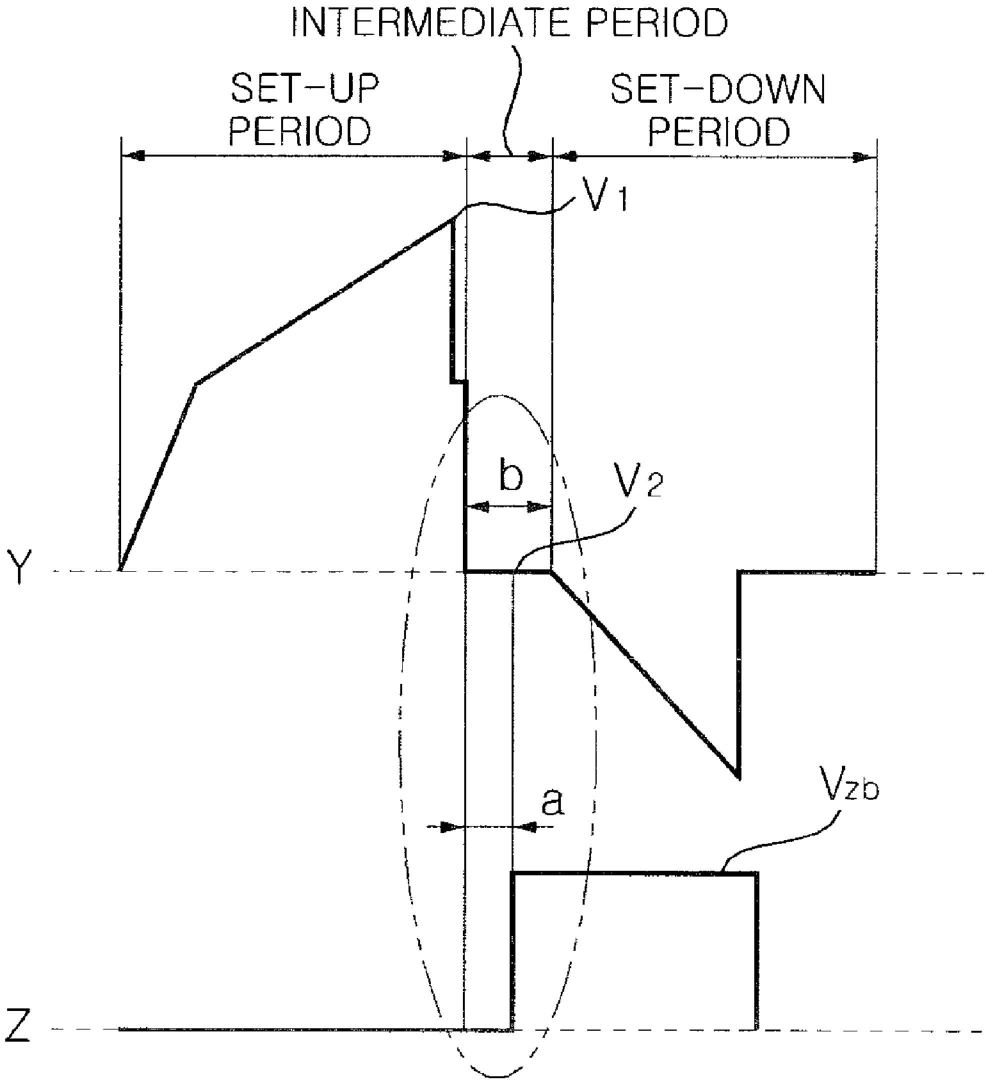
FIG. 6 illustrates a timing diagram of various signals for driving a PDP (particularly, a reset signal applied to scan electrodes) according to another exemplary embodiment of the present invention.

FIG. 6 illustrates a timing diagram of various signals for driving a PDP according to another exemplary embodiment of the present invention, and particularly, a reset signal and a bias voltage signal applied during a reset period. In the exemplary embodiment of FIG. 6, a plasma display device including a PDP having a plurality of scan electrodes Y formed on an upper substrate and a plurality of sustain electrodes Z formed on the upper substrate and a driving unit applying a driving signal to the scan electrodes Y and the sustain electrodes Z may be provided. Referring to FIG. 6, during a reset period of at least one of a plurality of subfields of a frame, a reset signal may be applied to a plurality of scan electrodes Y, and a positive bias voltage may be applied to a plurality of sustain electrodes Z as a bias voltage signal. The reset signal may include a set-up period during which the level of the reset signal gradually increases to a first voltage, an intermediate period during which the level of the reset signal is maintained at the second voltage, and a set-down period during the level of the reset signal gradually decreases from the second voltage.

A length a of the interval between the beginning of the intermediate period and the time when the application of the bias voltage signal to the sustain electrodes Z begins may be greater than 50% of a length b of the intermediate period.

The time when the level of the reset signal drops from the first voltage to the second voltage may be earlier than the time when the application of the bias voltage signal to the sustain electrodes Z begins.

The bias voltage signal may be applied to the sustain electrodes Z a predetermined amount of time after the beginning of the intermediate period. The predetermined amount of time may correspond to the length a. During the interval between the beginning of the intermediate period and the time when the application of the bias voltage signal to the sustain electrodes Z begins, the scan electrodes Y and the sustain electrodes Z may be maintained at the same electric potential level, and wall charge and spatial charge may cancel each other out by being coupled to each other. The more wall charge is formed in discharge cells, the more wall charge is removed in the discharge cells by being coupled with spatial charge. Accordingly, it is possible to improve the uniformity of the distribution of wall charge.

The second voltage may be determined to be a ground voltage in consideration of the ease of the design of circuitry and the difference between the electric potential of the scan electrodes Y and the electric potential of the sustain electrodes Z.

The length a may be 0.5-1.0 times greater than the length b. If the length a is more than one time greater than the length b, i.e., if the application of the bias voltage signal begins a predetermined amount of time after the beginning of the set-down period, the bias voltage signal may not be sufficiently applied to the sustain electrodes Z, and thus, the removal of wall charge may not be able to be properly performed during the set-down period.

It is possible to stabilize an address discharge operation by adjusting the length of the intermediate period, i.e., the length b. More specifically, the length b may be increased for an image signal that is highly likely to result in miswriting. Alternatively, the length b may be increased according to the temperature of the plasma display device. In this manner, it is possible to stabilize an address discharge operation.

The bias voltage signal may be determined to be the same as a sustain voltage in order to facilitate the design of circuitry and stabilize an address discharge operation during the set-down period. The bias voltage signal may be applied to the sustain electrodes Z without the need of additional power supply circuit.

Figure 7:
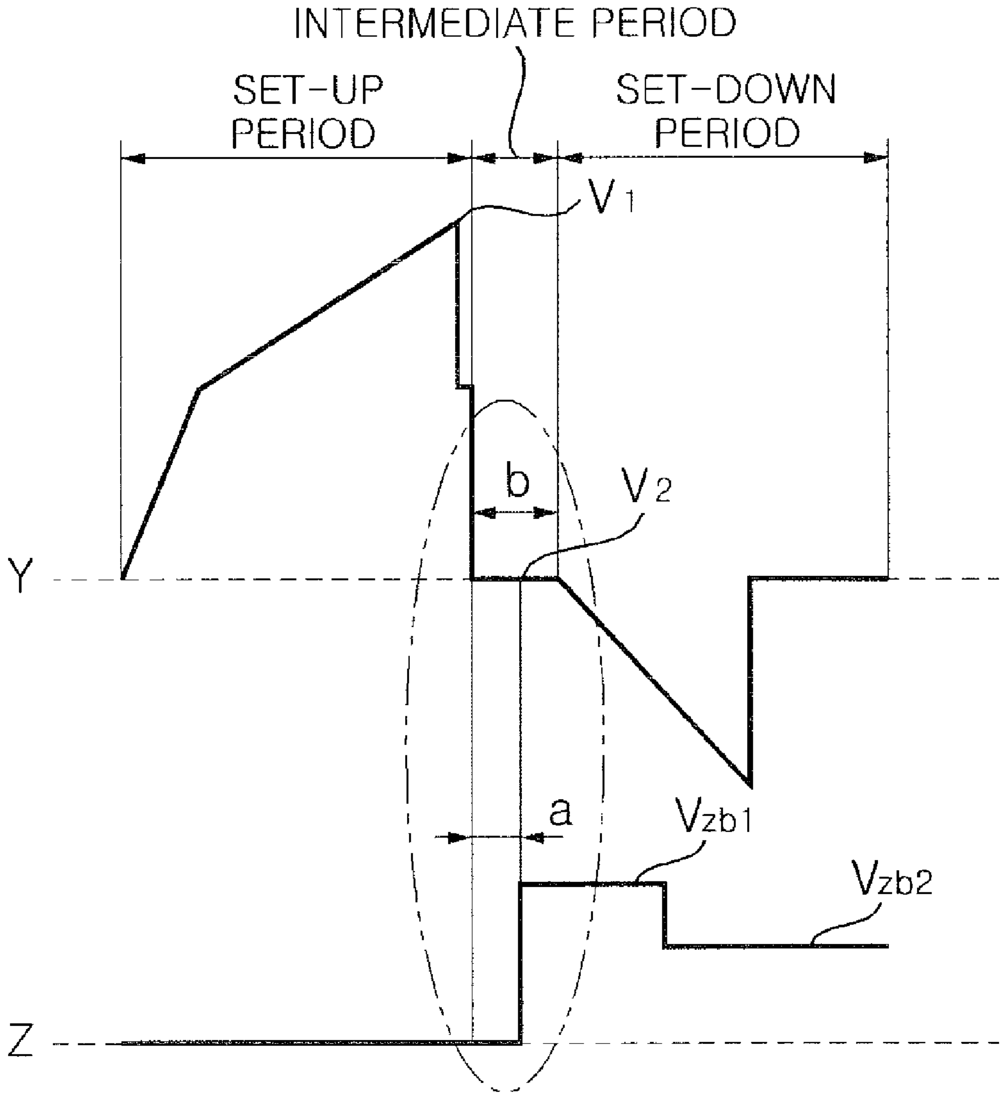
FIGS. 7 through 13 illustrate timing diagrams of various signals for driving a PDP according to other exemplary embodiments of the present invention.
Figure 8:
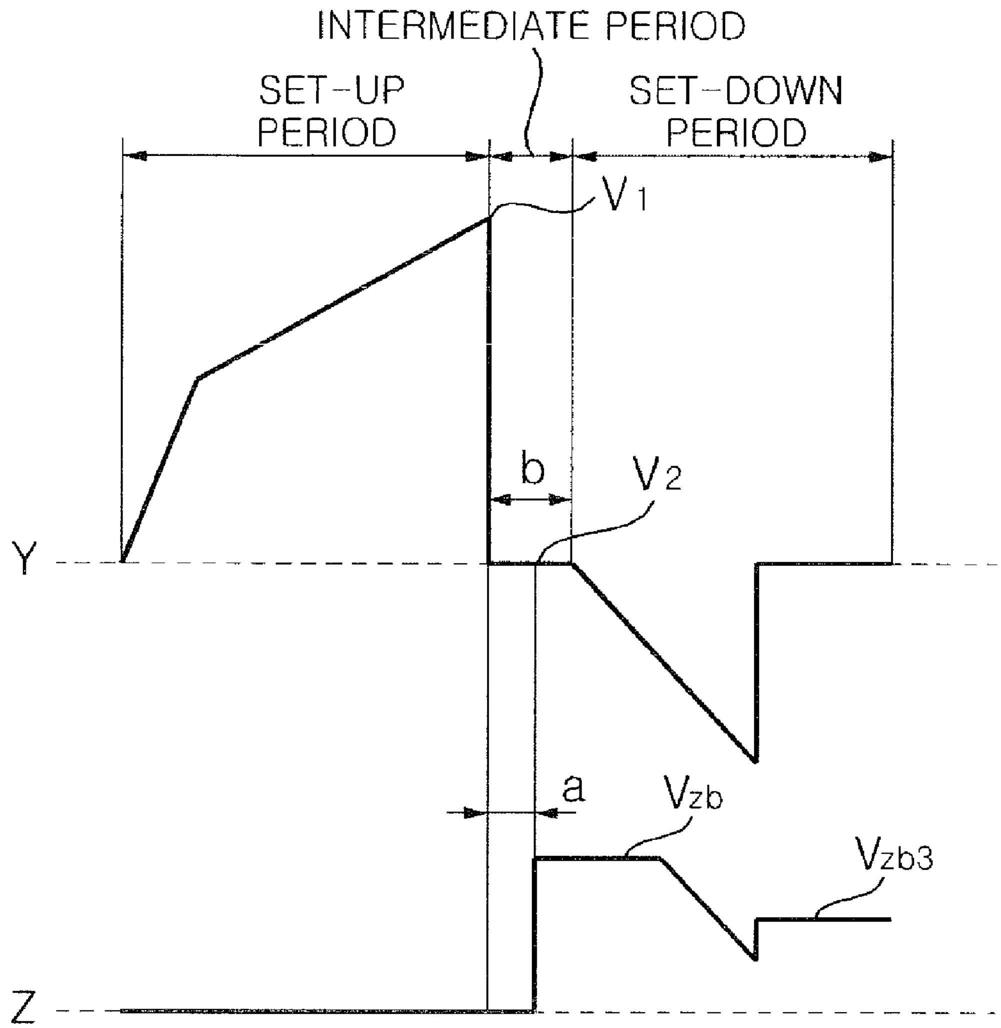

FIGS. 7 and 8 illustrate timing diagrams of various driving signals for driving a PDP according to other exemplary embodiments of the present invention. Referring to FIG. 7, a bias voltage signal having two or more voltages may be applied to a plurality of sustain voltages Z. For example, a first bias voltage $V_{zb1}$ and then a second bias voltage $V_{zb2}$, which is lower than the first bias voltage $V_{zb1}$, may be applied to the sustain electrodes Z as the bias voltage signal.

During a set-down period, a reset signal whose level gradually decreases may be applied to a plurality of scan electrodes Y, and a positive bias voltage $V_{zb}$ may be applied to the sustain electrodes Z as the bias voltage signal. As a result, a weak discharge may occur between the scan electrodes Y and the sustain electrodes Z, and thus, unnecessary wall discharge may be removed.

If a discharge operation is unstably performed during the set-down period, unnecessary wall discharge may not be able to be sufficiently removed, and thus, a bright-spot misdischarge and miswriting may occur.

In addition, a MgO protective layer or a phosphor layer may deteriorate after a long use of a PDP, and thus, the discharge properties of the PDP (such as surface- and opposing-discharge properties) may change. Therefore, the probability of occurrence of a bright-spot misdischarge and miswriting may increase according to the period of use of a PDP.

Referring to FIG. 7, it is possible to stabilize a weak discharge between the scan electrodes Y and the sustain electrodes Z and effectively control the occurrence of a bright-spot misdischarge and miswriting by applying the first bias voltage $V_{zb1}$, which is relatively high, to the sustain electrodes Z.

If the first bias voltage $V_{zb1}$ is applied to the sustain electrodes Z throughout the entire set-down period, a bright-spot misdischarge may occur during the set-down period due to the occurrence of an excessively strong discharge.

That is, if a discharge occurs too excessively during the set-down period, the probability of occurrence of a bright-spot misdischarge may increase. More specifically, the discharge properties of a PDP may change, and the probability of occurrence of a bright-spot misdischarge may increase after a long use of the PDP.

Therefore, referring to FIG. 7, the second bias voltage $V_{zb1}$, which is lower that the first bias voltage $V_{zb1}$, may be applied to the sustain electrodes Z a predetermined amount of time after the beginning of the set-down period. In this manner, it is possible to control the magnitude of a discharge late in the set-down period and thus to prevent the occurrence of a bright-spot misdischarge due to changes in the discharge properties of a PDP.

The level of the bias voltage signal may be maintained at the second bias voltage $V_{zb2}$ until an address period begins.

Referring to FIG. 8, during at least part of a set-down period, a bias voltage signal whose level gradually decreases may be applied to a plurality of sustain voltages Z. The level of the bias voltage signal may be maintained at a bias voltage $V_{zb3}$ until an address period begins.

Even when the level of the bias voltage signal reaches its minimum, there still is a high probability of occurrence of a misdischarge because the level of the bias voltage signal is still high enough to increase the difference between the electric potential of the sustain electrodes Z and the electric potential of a plurality of scan electrodes Y. Thus, during the set-down period, the sustain electrodes Z may be floated so that the level of the bias voltage signal can gradually decrease. In this manner, it is possible to reduce the difference between the electric potential of the sustain electrodes Z and the electric potential of the scan electrodes Y and prevent the occurrence of a misdischarge.

When the sustain electrodes Z are floated, the slope of the bias voltage signal applied to the electrodes Z may be the same as the slope of a reset signal applied to the scan electrodes Y.

Figure 9:
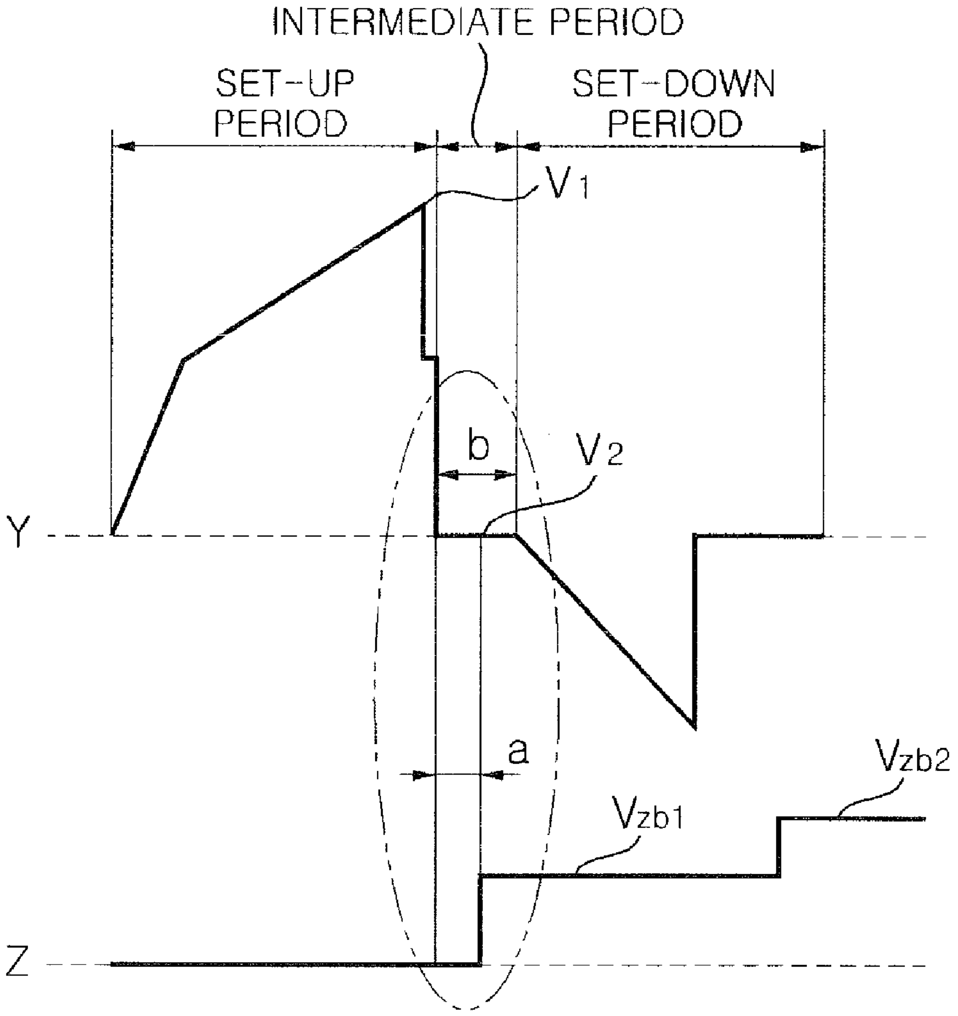

Referring to FIG. 9, a first bias voltage $V_{zb1}$ and then a second bias voltage $V_{zb2}$, which is higher than the first bias voltage $V_{zb1}$, may be applied to a plurality of sustain electrodes Z as a bias voltage signal. The level of the bias voltage signal may be maintained at the second bias voltage $V_{zb2}$ until the beginning of an address period.

In order to reduce the difference between the level of a reset signal applied to a plurality of scan electrodes Y and the level of the bias voltage signal applied to the sustain electrodes Z during the set-down period, the first bias voltage $V_{zb1}$ may be applied to the sustain electrodes Z. Thereafter, the second bias voltage $V_{zb2}$, which is higher than the first bias voltage $V_{zb1}$, may be applied to the sustain electrodes Z, thereby facilitating an address discharge operation.

Figure 10:
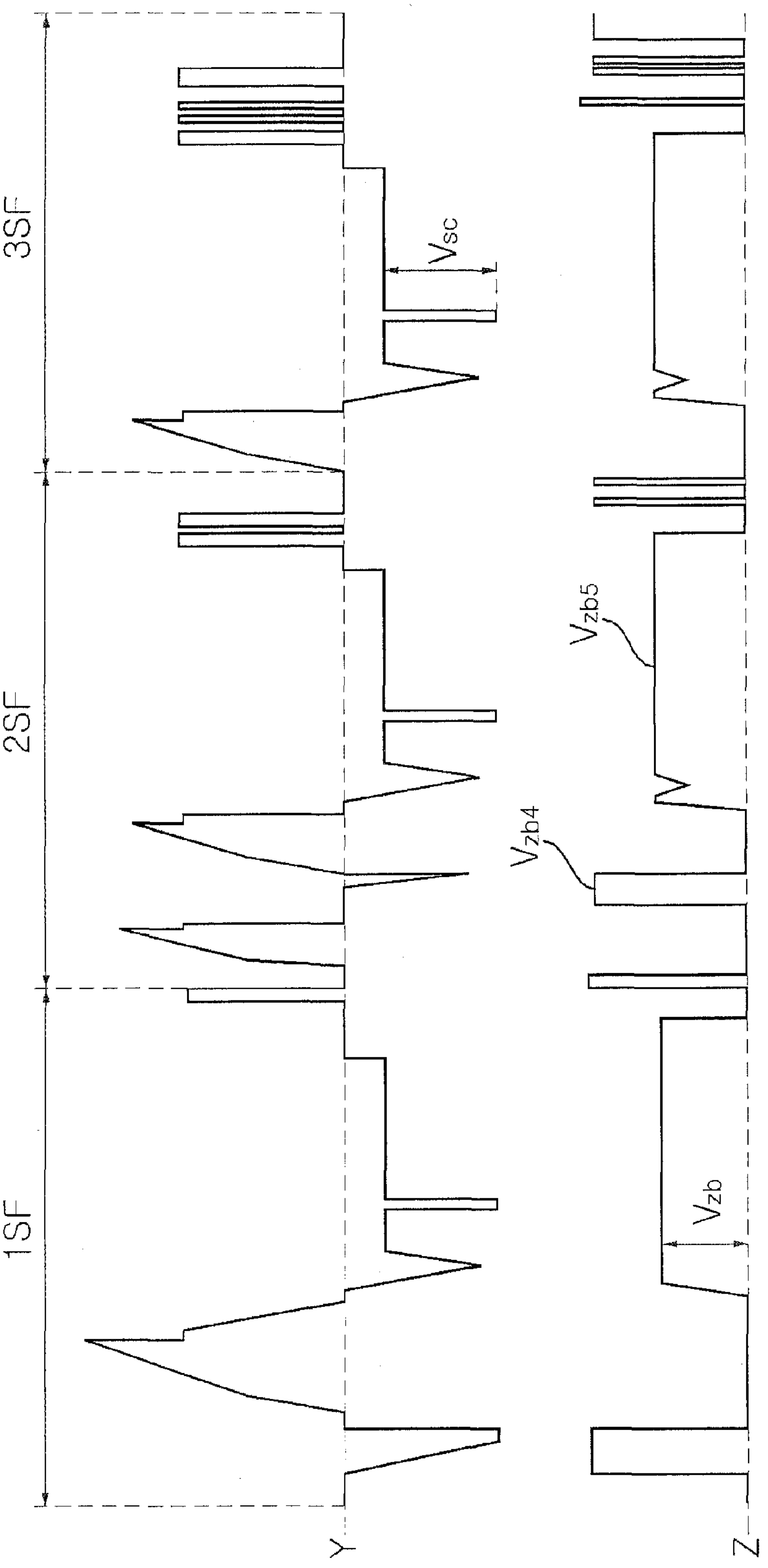

FIG. 10 illustrates a timing diagram of various signals for driving a PDP according to another exemplary embodiment of the present invention. Referring to FIG. 10, if a reset signal is applied to a plurality of scan electrodes Y only once, sufficient wall charge to cause an address discharge may not be able to remain in each discharge cell due to the imperfection of a PDP. For this, a plurality of reset signals may be applied to the scan electrodes Y during one of a plurality of subfields of a frame so that the wall charge state of each discharge cell can become appropriate for causing an address discharge. In this manner, it is possible to properly generate and leave wall charge in each cell and thus reduce the probability of occurrence of a misdischarge during an address period by applying a reset signal, for example, twice, to the scan electrodes Y.

More specifically, FIG. 10 illustrates the case where two reset signals, i.e., first and second reset signals, are applied to the scan electrodes Y during a second subfield. Referring to FIG. 10, when the first reset signal is applied to the scan electrodes Y, a positive bias voltage $V_{zb4}$ may be applied to a plurality of sustain electrodes Z.

Since the second reset signal is applied to the scan electrodes Y after the application of the first reset signal to the scan electrodes Y, the second reset signal may benefit from wall charge generated by a reset discharge caused by the first reset signal. However, if too much negative wall charge is formed in the scan electrodes Y and too much positive wall charge is formed in the sustain electrodes Z, a strong discharge may occur between the scan electrodes Y and the sustain electrodes Z, and thus, afterimage-type bright spots may be generated on a PDP. Therefore, it is necessary to appropriately control the amount of wall charge before the application of the second reset signal to the scan electrodes Y.

In the exemplary embodiment of FIG. 10, a plurality of reset signals may be applied to the scan electrodes Y during a reset period, and a bias voltage corresponding to a reset signal applied late in the reset period may be lower than a bias voltage corresponding to a reset signal applied early in the reset period. Referring to FIG. 10, the positive bias voltage $V_{zb4}$ may be applied to the sustain electrodes Z in response to the application of the first reset signal to the scan electrodes Y, and a positive bias voltage $V_{zb5}$, which is lower than the positive bias voltage $V_{zb4}$, may be applied to the sustain electrodes Z in response to the application of the second reset signal to the scan electrodes Y.

A high bias voltage may be applied to the sustain electrodes Z early in the reset period, thereby sufficiently removing unnecessary wall charge and realizing a uniform distribution of wall charge for the next reset discharge. Since the distribution of wall charge is more uniform late in the reset period than early in the reset period due to the repetition of a reset discharge, it is possible to properly remove unnecessary wall charge late in the reset period simply by applying a low bias voltage.

Therefore, since negative wall discharge can be formed in the scan electrodes Y by the second reset signal, it is possible to perform a stable address discharge operation and thus to prevent the occurrence of a bright-spot misdischarge.

Figure 11:
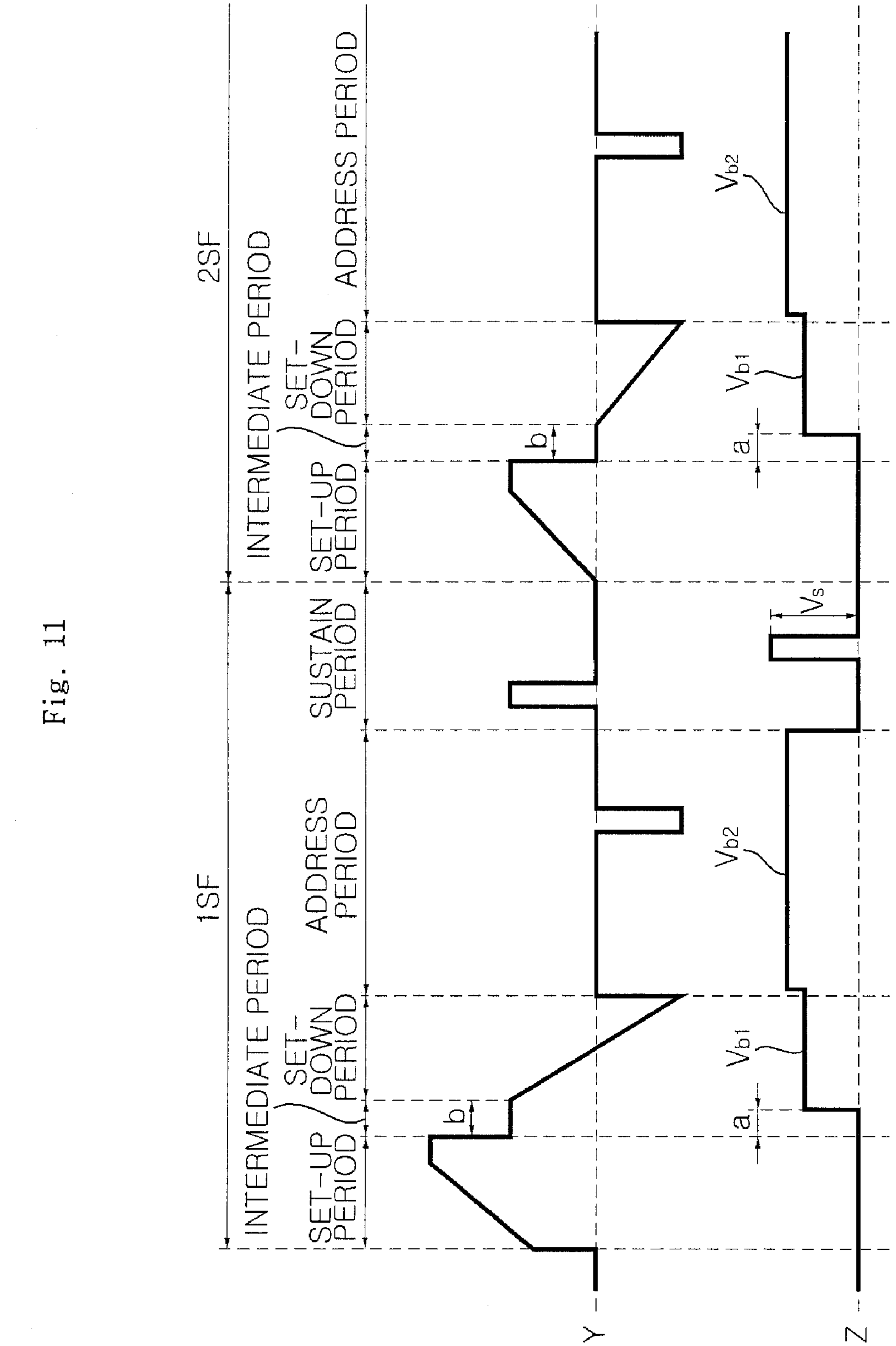
Figure 12:
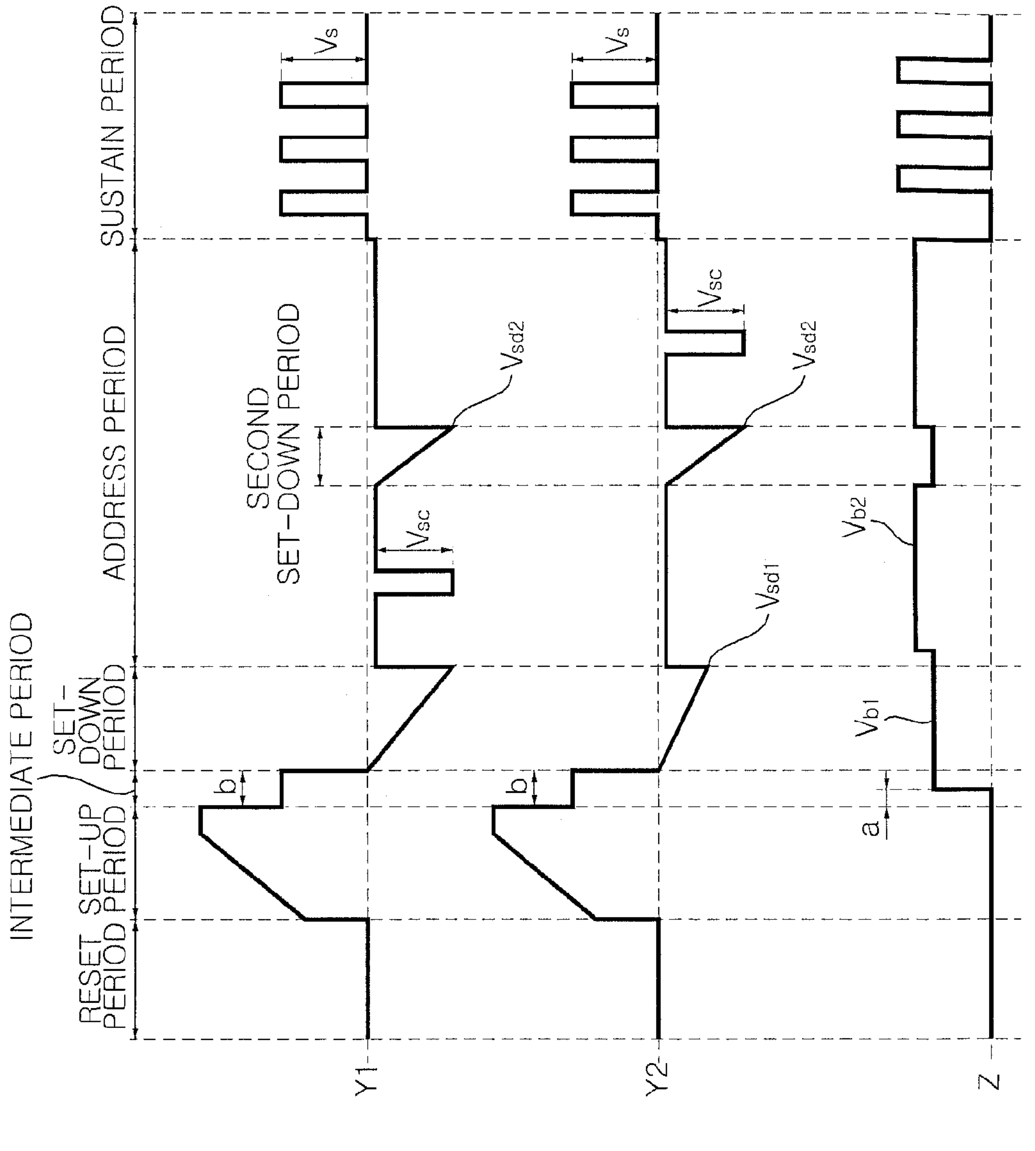

FIGS. 11 and 12 illustrate a timing diagram of various signals for driving a PDP according to another exemplary embodiment of the present invention. Referring to FIG. 11, a bias voltage $V_{b1}$ may be applied to a plurality of sustain electrodes Z during an address period, and a bias voltage $V_{b2}$, which is higher than the bias voltage $V_{b1}$, may be applied to a plurality of sustain electrodes Z during an address period. Since the voltage of a plurality of scan electrodes Y reaches its minimum during a set-down period of the reset period, a bias voltage lower than the bias voltage to be applied to the sustain electrodes Z during the address period may be applied to the sustain electrodes Z during the reset period. Thus, it is possible to reduce the difference between the electric potential of the scan electrodes Y and the electric potential of the sustain electrodes Z and thus to prevent the occurrence of a misdischarge.

The maximum voltage of the scan electrodes Y during a first subfield 1SF of a frame may be higher than the maximum voltage of the scan electrodes Y during the rest of the frame. Since the remaining frame can benefit from a priming effect produced by a sustain discharge occurred during the sustain period of the first subfield 1SF, it is possible to properly cause a reset discharge during the remaining frame by using a lower voltage than that used during the first field of the frame.

The bias voltages $V_{b1}$ and $V_{b2}$ may be lower than a sustain voltage $V_s$. The address period of at least one of a plurality of subfields of a frame may include a second set-down period during which the voltage of the scan electrodes Y gradually decreases.

Referring to FIG. 12, during a second set-down period of an address period, a second set-down signal whose level gradually decreases may be applied to the scan electrodes Y. In this case, in order to prevent wall charge loss from the scan electrodes Y, a minimum level of a first set-down signal applied during a first set-down period of a reset period, i.e., a voltage $V_{sd1}$, may be set to be higher than a minimum level of the second set-down signal applied during the second set-down period of the address period, i.e., a voltage $V_{sd2}$. That is, the absolute value of the voltage $V_{sd1}$ may be less than the absolute value of the voltage $V_{sd2}$. In this manner, it is possible to reduce the amount of wall charge removed and thus to improve the efficiency of use of wall charge for an address discharge operation.

In addition, in order to effectively prevent wall charge loss from the scan electrodes Y, the minimum level of a first set-down signal applied to a number of scan electrodes Y1 in which an address discharge is to occur early in the address period may be lower than the minimum level of a first set-down signal applied to a number of scan electrodes Y2 in which an address discharge is to occur late in the address period. Since an address discharge operation is performed on the scan electrodes Y2 later than on the scan electrodes Y1, the amount of wall charge lost from the scan electrodes Y2 is greater than the amount of wall charge lost from the scan electrodes Y1. Thus, it is necessary to cause a weaker reset discharge for removing wall charge in the scan electrodes Y2 than in the scan electrodes Y1 during the first set-down period.

Since little wall charge is naturally lost from the scan electrodes Y1, the length of the first set-down period may be set to be substantially the same as the length of the second set-down period in order to facilitate the design and control of driving circuitry.

A bias voltage $V_{b3}$ applied to the sustain electrodes Z during the second set-down period may be lower than the bias voltage $V_{b2}$.

In order to facilitate the design and control of driving circuitry, the bias voltage $V_{b3}$ may be set to be the same as the bias voltage $V_{b1}$, which is applied to the sustain electrodes Z during the first set-down period.

The exemplary embodiment of FIGS. 11 and 12 may be applied to some of a plurality of subfields of a frame. For example, the exemplary embodiment of FIGS. 11 and 12 may be applied to any one of the subfields of a frame except for the first subfield.

Figure 13:
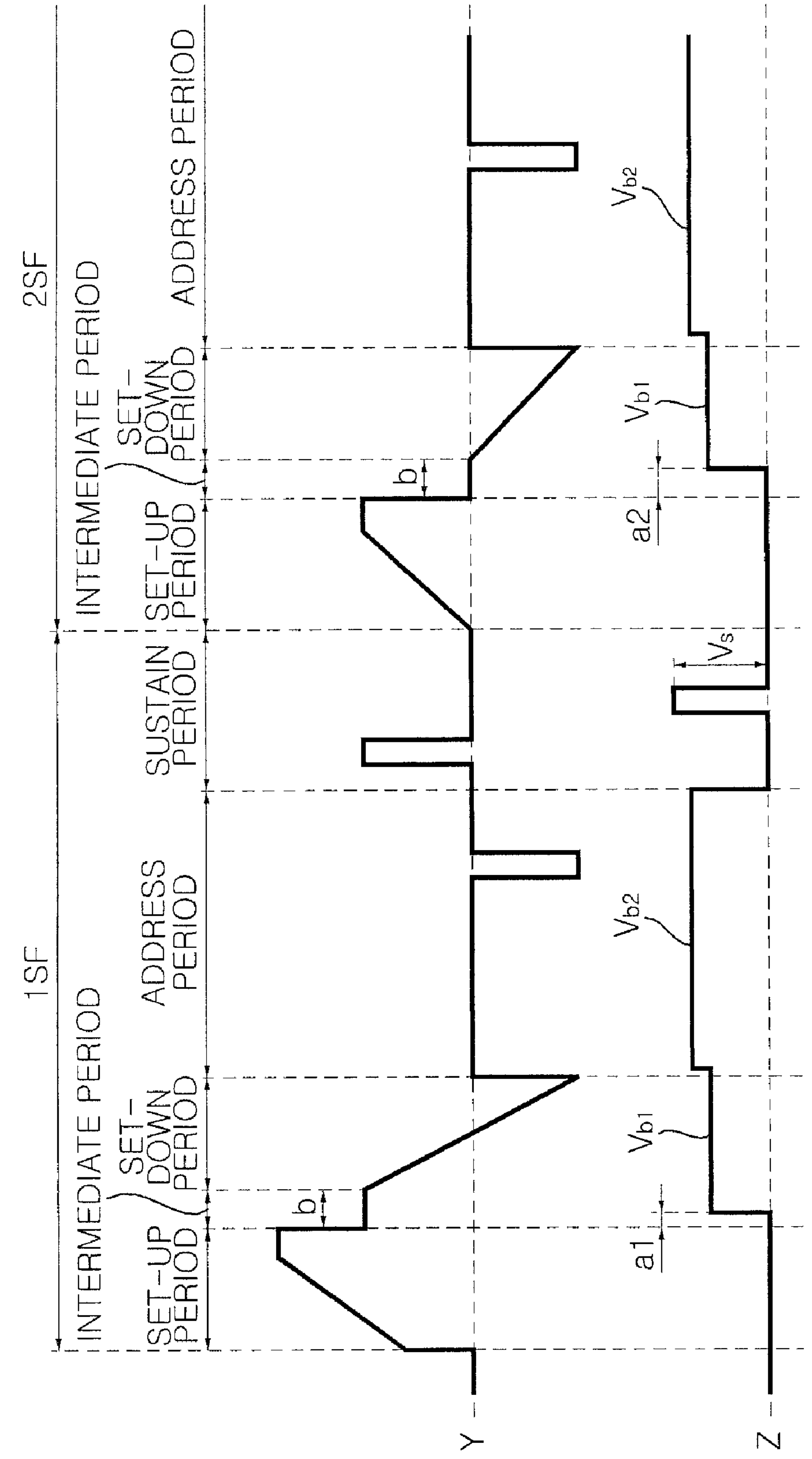

FIG. 13 illustrates a timing diagram of various signals for driving a PDP according to another exemplary embodiment of the present invention. Referring to FIG. 13, during a reset period of at least one of a plurality of subfields of a frame, a reset signal may be applied to a plurality of scan electrodes Y, and a positive bias voltage may be applied to a plurality of sustain electrodes Z as a bias voltage signal. The reset signal may include a set-up period during which the level of the reset signal gradually increases to a first voltage, an intermediate period during which the level of the reset signal drops from the first voltage to a second voltage and is then maintained at the second voltage, and a first set-down period during the level of the reset signal gradually decreases from the second voltage. The time when the application of the bias voltage signal begins may be earlier than the time when the level of the reset signal drops to the second voltage.

Since there is an interval between the time when the application of the bias voltage signal begins may be earlier than the time when the level of the reset signal drops to the second voltage, it is possible to prevent the difference between the electric potential of the scan electrodes Y and the electric potential of the sustain electrodes Z from rapidly increasing due to a rapid switching of the scan electrodes Y and the sustain electrodes Z and thus to address various problems such as the generation of complementary bright spots and the occurrence of voltage peaking that may have been caused by a strong discharge between the scan electrodes Y and the sustain electrodes Z.

A length b1 of an intermediate field of a first field may be different from a length B2 of an intermediate field of a second field.

More specifically, it is possible to stabilize an address discharge operation by appropriately adjusting the length of an intermediate period. For example, the length of an intermediate period may be increased for an image signal that is highly likely to cause miswriting. Alternatively, the length of an intermediate period may be increased according to the temperature of a plasma display device. The length of an intermediate period may be reduced in consideration of timing margins.

The length b2 may be greater than the length b1.

The interval between the time when the application of the bias voltage signal begins and the time when the level of the reset signal drops to the second voltage may vary from the first subfield 1SF to the second subfield 2SF. Referring to FIG. 13, in the first subfield 1SF, the interval between the time when the application of the bias voltage signal begins and the time when the level of the reset signal drops to the second voltage may have a length a1. On the other hand, in the second subfield 2SF, the interval between the time when the application of the bias voltage signal begins and the time when the level of the reset signal drops to the second voltage may have a length a2, which is different from the length a1. More specifically, the length a1 may be less than the length a2. That is, a portion of a reset period during which the electric potential of the scan electrodes Y is maintained to be the same as the electric potential of the sustain periods Z is longer in the second subfield 2SF than in the first subfield 1SF. Therefore, since unnecessary wall charge can be lost naturally, it is possible to minimize the differences between the charge levels of discharge cells.

The whole frame except for the first subfield 1SF can benefit from a priming effect produced by a sustain discharge occurred during the sustain period of the first subfield 1SF. Thus, during the whole frame except for the first subfield 1SF, it is possible to properly remove unnecessary wall charge simply by causing a weak reset discharge.

According to the present invention, it is possible to prevent the difference between the electric potential of a plurality of scan electrodes and the electric potential of a plurality of sustain electrodes from rapidly increasing due to a rapid switching of the scan electrodes and the sustain electrodes and thus to address various problems such as the generation of complementary bright spots and the occurrence of voltage peaking that may have been caused by a strong discharge between the scan electrodes and the sustain electrodes. In addition, it is possible to improve the discharge properties and picture quality of a PDP.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A plasma display device, comprising:

a plasma display panel (PDP) including an upper substrate and a lower substrate, a plurality of scan electrodes, a plurality of sustain electrodes, and a plurality of address electrodes provided between the upper and lower substrates; and a driving unit applying a number of driving signals to the scan electrodes and the sustain electrodes, wherein, during a reset period of at least one of a plurality of subfields of a frame, a reset signal is applied to the scan electrodes and a positive bias voltage is applied to the sustain electrodes as a bias voltage signal, the reset period of the one of the plurality of subfields includes:

a set-up period during which a level of the reset signal gradually increases to a first voltage, an intermediate period during which the level of the reset signal drops from the first voltage to a second voltage and is then maintained at the second voltage, and a first set-down period during which the level of the reset signal gradually decreases from the second voltage, wherein the bias voltage signal is applied to the sustain electrodes during the intermediate period that follows the set-up period, and wherein a length of an interval between a beginning of the intermediate period and a time when application of the bias voltage signal begins is at least 50% of a length of the intermediate period.

2. The plasma display device of claim 1, wherein a level of the bias voltage signal is the same as a sustain voltage.

3. The plasma display device of claim 1, wherein the second voltage is a ground voltage.

4. The plasma display device of claim 1, wherein two or more bias voltages are applied to the sustain electrodes as the bias voltage signal.

5. The plasma display device of claim 4, wherein a first bias voltage and a second bias voltage, which is higher than the first bias voltage, are sequentially applied to the sustain electrodes as the bias voltage signal.

6. The plasma display device of claim 1, wherein the first set-down period includes a time period during which a level of the bias voltage signal gradually decreases.

7. The plasma display device of claim 1, wherein, during the reset period, a plurality of reset signals are applied to the scan electrodes, and a bias voltage applied to the sustain electrodes corresponding to a reset signal applied late in the reset period is lower than a bias voltage applied to the sustain electrodes corresponding to a reset signal applied earlier than the reset signal applied late in the reset period.

8. The plasma display device of claim 1, wherein a bias voltage applied to the sustain electrodes during the reset signal is lower than a bias voltage applied to the sustain electrodes during an address period.

9. The plasma display device of claim 1, wherein an address period of the at least one of the subfields includes a second set-down period during which a voltage of the scan electrodes gradually decreases.

10. The plasma display device of claim 9, wherein a slope of the reset signal during the first set-down period is substantially the same as a slope of the voltage of the scan electrodes during the second set-down period.

11. The plasma display device of claim 9, wherein an absolute value of a minimum voltage of the scan electrodes during the first set-down period is less than an absolute value of a minimum voltage of the scan electrodes during the second set-down period.

12. The plasma display device of claim 9, wherein a bias voltage applied to the sustain electrodes during the second set-down period is lower than a bias voltage applied to the sustain electrodes during the remainder of the address period.

13. The plasma display device of claim 1, wherein a maximum voltage applied to the scan electrodes during the first subfield of the frame is higher than a maximum voltage applied to the scan electrodes during the remaining subfields of the frame.

14. A plasma display device comprising:

a plasma display panel (PDP) including an upper substrate, a plurality of scan electrodes formed on the upper substrate and a plurality of sustain electrodes formed on the upper substrate; and a driving unit applying a number of driving signals to the scan electrodes and the sustain electrodes, wherein, during a reset period of at least one of a plurality of subfields of a frame, a reset signal is applied to the scan electrodes and a positive bias voltage is applied to the sustain electrodes as a bias voltage signal, wherein the reset period of the one of the plurality of subfields includes a set-up period during which a level of the reset signal gradually increases to a first voltage, an intermediate period during which the level of the reset signal drops from the first voltage to a second voltage and is then maintained at the second voltage, and a first set-down period during which the level of the reset signal gradually decreases from the second voltage, wherein the intermediate period follows the set-up period of the one of the subfields, and wherein a time when the level of the reset signal drops to the second voltage is earlier than a time when application of the bias voltage signal begins.

15. The plasma display device of claim 14, wherein an interval between the time when the level of the reset signal drops to the second voltage and the time when the application of the bias voltage signal begins is 0.5-1.0 times longer than the intermediate period.

16. The plasma display device of claim 14, wherein a length of the intermediate period of a first one of the plurality of subfields is different from a length of the intermediate period of a second one of the plurality of subfields.

17. The plasma display device of claim 16, wherein the length of the intermediate period of the second subfield is greater than the length of the intermediate period of the first subfield.

18. The plasma display device of claim 14, wherein the bias voltage signal is applied during the intermediate period, and a length of an interval between the time when the level of the reset signal drops to the second voltage and the time when the application of the bias voltage signal begins varies from a first one of the subfields to a second one of the subfields that follows the first one of the subfields.

19. The plasma display device of claim 18, wherein the length of the interval between the time when the level of the reset signal drops to the second voltage and the time when the application of the bias voltage signal begins is shorter in the first subfield than in the second subfield.

* * * * *